United States Patent [19]
Hughes

[11] 3,725,932
[45] Apr. 3, 1973

[54] RECEIVERS FOR PHASE COMPARISON RADIO NAVIGATION SYSTEMS

[75] Inventor: David Geoffrey Hughes, London, England

[73] Assignee: Decca Limited, London, England

[22] Filed: Nov. 9, 1970

[21] Appl. No.: 88,037

[30] Foreign Application Priority Data

Nov. 10, 1969 Great Britain................54,973/69

[52] U.S. Cl. ...........................................343/105 R
[51] Int. Cl..............................................G01s 1/30
[58] Field of Search..........343/105 R, 105 H, 105 LS

[56] References Cited

UNITED STATES PATENTS 3,270,343    8/1966    Bridges............................343/105 R Primary Examiner—Benjamin A. Borchelt
Assistant Examiner—Denis H. McCabe
Attorney—Mawhinney & Mawhinney

[57] ABSTRACT

In a phase comparison radio navigation system in which a receiver may be operated with signals from a number of different chains of transmitting stations, each chain using radiations on a number of different harmonics nf of a common fundamental frequency f, the different chains using different fundamental frequencies, the receiver is provided with an oscillator and divider chain feeding a syntheizer matrix to form a frequency syntheizer to provide heterodyne signals of frequency $n \Delta$ for changing the frequencies of the received signals from harmonics of f to harmonics of F where F a fixed frequency used in the receiver for all chains. This oscillator and divider chain also provides timing signals for effecting a digital phase comparison between multiple frequency signals radiated in turn for short periods from the various stations to provide lane identification (for resolving ambiguities in the much more highly accurate but ambiguous normal position line determination).

7 Claims, 6 Drawing Figures

| FIGURE.2. | FIGURE.3. |
| --- | --- |
| FIGURE.4. | FIGURE.5. |

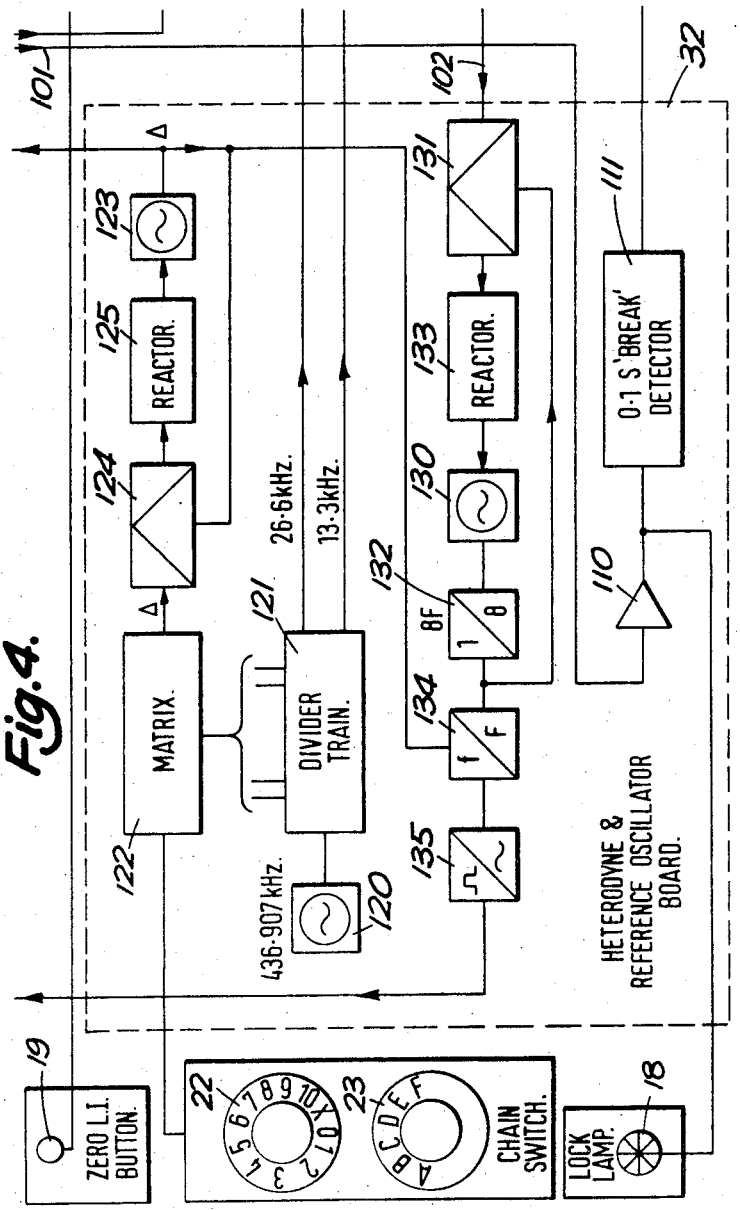

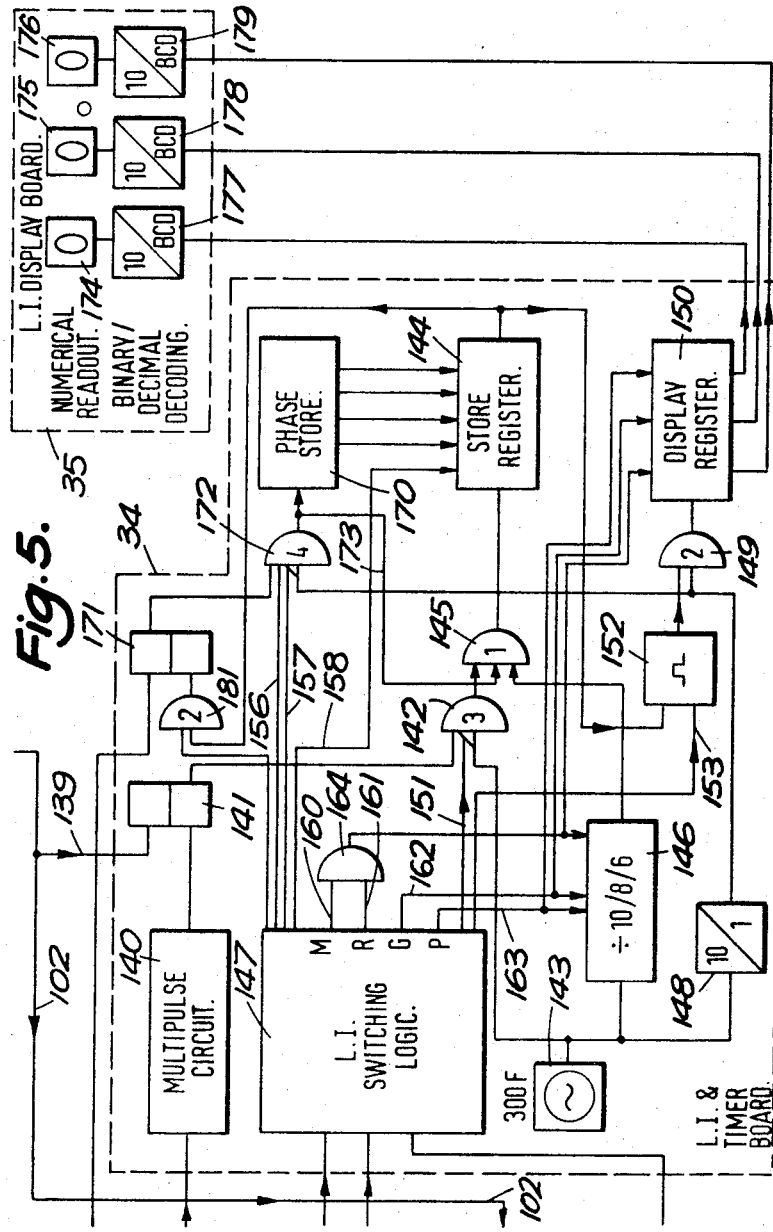

RECEIVERS FOR PHASE COMPARISON RADIO NAVIGATION SYSTEMS

BACKGROUND OF THE INVENTION

1. Field of the Invention

This invention relates to receivers for phase comparison radio navigation systems of the kind in which a phase comparison is made between signals of different but harmonically related frequencies from three or four fixed stations which radiate signals in a fixed phase relation.

2. Description of the Prior Art

The three or four ground stations which radiate signals in a fixed phase relation are known as a chain. In a typical chain of the system known as the Decca (Registered Trade Mark) Navigator system, there is a master station normally radiating radio frequency signals of frequency 6f and three slave stations, known as the red, green and purple slaves radiating normally signals of 8f, 9f and 5f, where f is the fundamental frequency for the chain. In such systems, highly accurate positional information is obtainable in the receiver by phase comparisons of pairs of signals (usually the master signal separately with each of the slave signals) at the lowest common multiple frequency of each pair. This information however is ambiguous since the spacing of the stations is such that many complete cycles of phase change occur in traversing the operational area of the system. For this reason provision is usually made to enable phase comparisons to be made at much lower effective frequencies thereby to identify the "lanes" (i.e., the areas defined by one complete cycle of phase change) of the more accurate information. The present invention is more particularly concerned with systems in which, for this lane identification, the normal transmissions are interrupted and the various fixed transmitting stations, one at a time, radiate all the frequencies together in a fixed phase relation to form what is known as a multipulse. By appropriate choice of this phase relation, an effective fundamental frequency signal can readily be obtained at the receiver. The multipulses from the various stations are radiated in sequence but it is necessary, at the receiver, to distinguish between and to identify the various multipulses and the present invention is concerned more particularly with the control of switching logic in a receiver to provide multipulse identification signals.

It is commonly required, in radio navigation systems of the kind described, that a receiver should be capable of operating with a number of different chains. This may be done by using slightly different fundamental frequencies f for the various different chains. In the receiver, the received signals are converted by heterodyning to signals which are the appropriate multiples of a fixed fundamental frequency F. This may be done by using a heterodyne signal of frequency Δ which is equal to f+F. To convert a signal of frequency nf to nF, a signal of n Δ is mixed with nf and the lower side band of nF is selected by a filter or tuned amplifier or other frequency selective circuit.

SUMMARY OF THE INVENTION

According to the present invention, in a receiver for a phase comparison radio navigation system of the kind in which signals of different multiplies of a fundamental frequency f are radiated in fixed phase relation from spaced transmitting stations, the transmitting stations normally radiating one signal at a time, the various stations radiating different frequencies but in which periodically the normal transmissions are interrupted and each station, one at a time in sequence, radiates all the frequencies to form a multipulse for lane identification, the multipulse being in a fixed cyclic time sequence from the various stations, and in which the receiver is of the heterodyne type for receiving signals from chains operating on different fundamental frequencies, the receiver has a frequency synthesizer including a stable oscillator and divider chain for providing a plurality of selectable different frequencies for heterodyning the received signals whereby phase comparison means operating at fixed frequencies may be used irrespective of the actual radiated frequencies of the transmitting stations being used. Means may be provided for deriving, from the frequency synthesizer, timing signals for providing outputs forming gating pulses for the successive received multipulse signals.

By this construction, only one stable oscillator is required. This may be a crystal oscillator. The receiver preferably has means for detecting the multipulse signals or for detecting signalling information indicating the start of the multipulse signals. In the Decca (Registered Trade Mark) navigator system employing transmission on 6f, 8f, 9f and 5f it is, at present, the practice to have a 0.1 second break in the 6f master transmissions before each multipulse and there may be provided a "break" detector to detect this interruption of the 6f signals. By means of a divider operating on signals from the frequency synthesizer, pulses may be obtained providing times gating pulses separately synchronized with the multipulses from the different transmitters.

BRIEF DESCRIPTION OF THE DRAWINGS

FIG. 4 is a schematic diagram of a heterodyne and locked oscillator unit of the receiver of FIG. 1, showing also certain further controls, FIG. 5 is a schematic diagram of a lane identification and timer unit of the receiver of FIG. 1 together with a further display unit.

DESCRIPTION OF THE PREFERRED EMBODIMENT

Figures 1, 6:
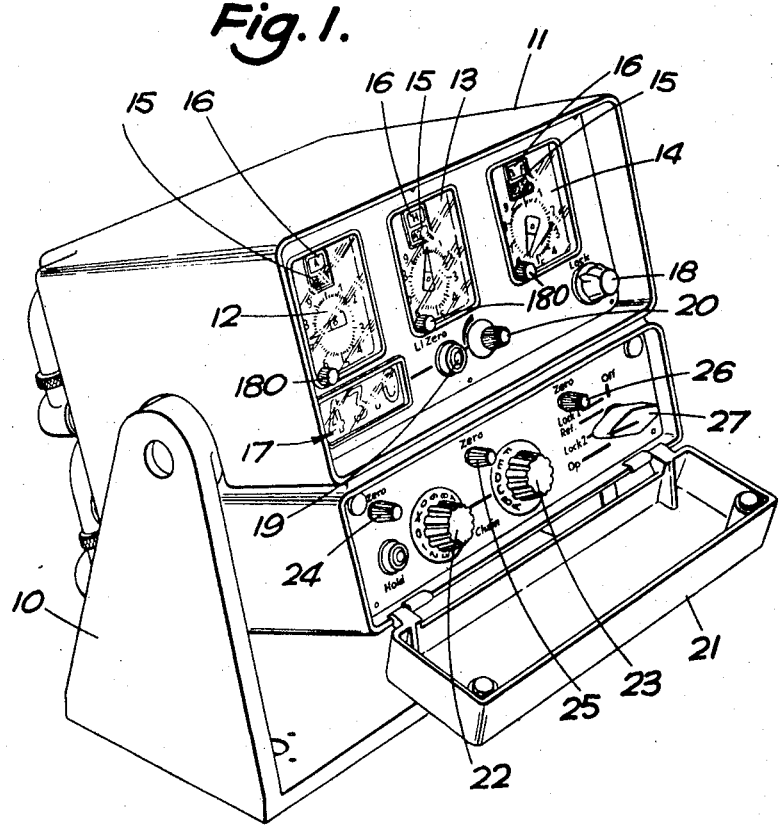
FIG. 1 is a perspective view of a receiver and display unit for a phase comparison radio navigation system.
FIG. 6 is a diagram showing how FIGS. 2, 3 4 and 5 fit together to form the complete receiver display system.

The receiver and display unit shown in the drawings is for use with fixed transmitting stations of the Decca (Registered Trade Mark) system. Each chain of transmitters comprises a master station and usually three slave stations, known as the red, green and purple slaves. The master station normally radiates continuous signals of a frequency 6f where f is a fundamental frequency of the order of 14 kHz. The red, green and purple slaves normally radiate on frequencies 8*f*, 9*f* and 5*f*. All the radiated signals are locked in phase. Periodically the transmissions from all the stations are interrupted and a short duration signal of all the frequencies 5*f*, 6*f*, 8*f* and 9*f* in fixed phase relation is radiated from one station. This signal is referred to as the multipulse signal. The multipulse signal is radiated in sequence from the master station and the red, green and purple slaves. Each multipulse transmission is preceded by a break of 0.1 seconds in the normal master (6*f*) transmission.

The normal transmissions are utilized in a mobile receiver by separately comparing the phase of each of the received slave signals (8*f*, 9*f* and 5*f*) with the received master 6*f* signals. The comparisons are effectively at the lowest common multiple frequencies. The phase angle is indicated to provide fine positional information with respect to three sets of hyperbolic position lines. This final positional information corresponds to the phase angle within a cycle but is ambiguous in that each hyperbolic pattern covers many complete cycles. The various different cycles of the pattern are referred to as lanes. The multipulse signals are used for lane identification. In this receiver the effective comparison frequency employed is the fundamental frequency. A phase measurement at this frequency gives a coarser indication which serves to identify a lane within a zone, a zone being 24 lanes for the red pattern, 18 lanes for the green pattern and 30 lanes for the purple pattern.

The receiver can be utilized with any of a number of different chains. The different chains have fundamental frequencies which differ by small amounts. This is achieved, as will be more fully explained later by superheterodyne operation to convert the received signals of 5*f*, 6*f*, 8*f* and 9*f* to 5*F*, 6*F*, 8*F* and 9*F* by mixing with the appropriate harmonics of a hererodyne frequency $\Delta$ where $\Delta = f + F$, using the lower side bands of the mixer outputs. Thus the normal phase comparison is effected in the circuitry at the frequencies 24*F* for red, 18*F* for green and 30*F* for purple whilst the lane identification has a comparison frequency of 1*F*, although the effective frequencies are 24*f*, 18*f* and 30*f* for the normal patterns and 1*f* for lane identification.

Referring now to FIG. 1, the receiver and display unit illustrated is particularly for marine use and comprises a base 10 with a trunnion mounted display unit 11 containing all the circuitry which, with the exception of a cold-cathode number tube display, is all solid-state utilizing printed circuit boards. The power supplies are provided by a power supply unit (not shown) fitting onto the bottom of the assembly of FIG. 1, this power supply unit being interchangeable so that an appropriate unit may be fitted according as to whether the external supply is A.C. or D.C. and to its voltage and frequency.

In the upper part of the unit 11 are the red, green and purple fractional lane indicators 12, 13 and 14 (known as decometers), each comprising a pointer rotatable over a dial. Associated with each of the fractional lane indicators are integrating lane counters in the form of rotating discs. It will be seen that each fractional lane indicator has a lane indicator 15 and a zone indicator 16. The lane indication from the multiple signals is shown on a three digit cold cathode number tube display 17.

The panel of the upper unit also includes a "lock lamp" 18 to be described later, a lane identification zero push button 19 and a dimmer control 20 for the display 17.

In the lower part of the assembly, a hinged cover 21 is provided for covering certain controls, primarily for setting up, these controls being a pair of multiposition switches 22, 23 for chain selection, zero setting controls 24, 25 and 26 for the three decometers and a function switch 27.

Referring now to FIGS. 2 to 5, the main units, each formed by a single circuit board and indicated by dashed line boxes, are an R.F/I.F unit 30 (shown in FIG. 2), a heterodyne and reference oscillator unit 32 (shown in FIG. 4), a locked oscillator unit 33 (shown in FIG. 3) and a lane identification and timer 34 (shown in FIG. 5) with which is associated a smaller board 35 (also shown in FIG. 5) for the display 17. FIGS. 2 to 5 fit together as shown in FIG. 6.

Figure 2:
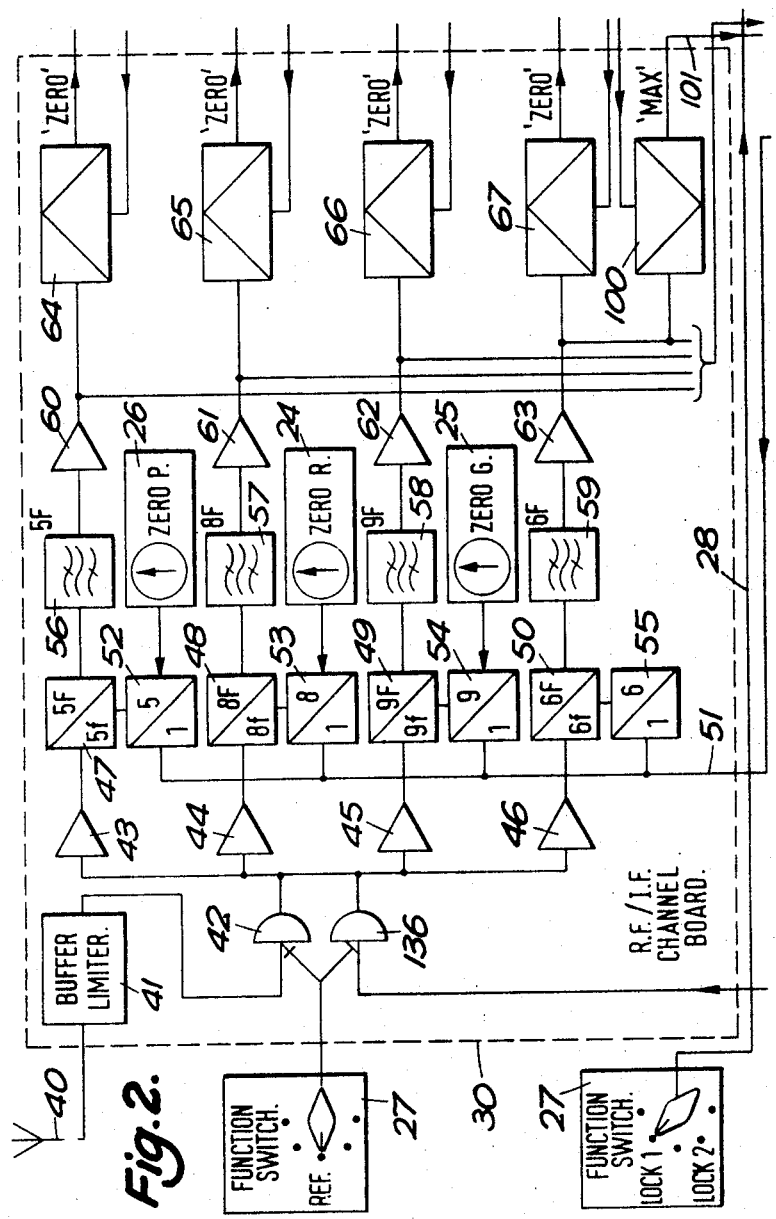
FIG. 2 is a schematic diagram of a radio frequency/intermediate frequency unit forming part of the receiver of FIG. 1 and including also certain controls.
Figure 3:
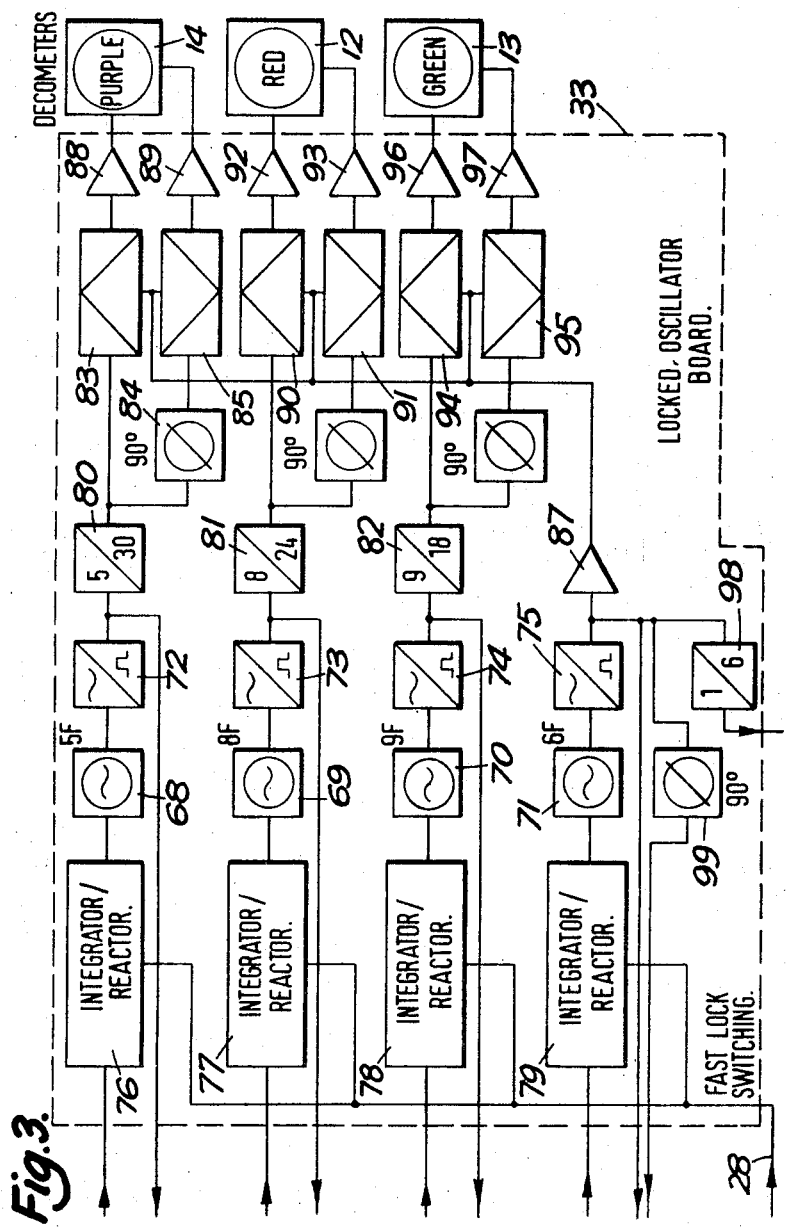
FIG. 3 is a schematic diagram of a locked oscillator unit of the receiver of FIG. 1 showing also certain display indicators.

An aerial 40 (FIG. 2) is connected via a buffer/limiter 41 and gate 42 to amplifiers 43, 44, 45 and 46 tuned respectively to 5*f*, 8*f*, 9*f* and 6*f* but of sufficient bandwidth to amplify signals from any selected chain. The outputs from these amplifiers are fed respectively to mixers 47, 48, 49 and 50 where they are mixed with the appropriate harmonics of the $\Delta$ signals from the unit 32. For this purpose, the $\Delta$ signals on a lead 51 from unit 32 are fed to multipliers 52, 53, 54 and 55 to provide the appropriate harmonics. Associated with the multipliers 52, 53 and 54 respectively are the zero setting controls 26, 24 and 25 which, although shown within the box 30 of FIG. 2, are located on the lower panel as shown in FIG. 1. The required lower sidebands of 5*F*, 8*F*, 9*F* and 6*F* from the mixers 47, 48, 49 and 50 are selected by band pass filters 56, 57, 58 and 59 and the filter outputs are amplified by amplifiers 60, 61, 62 and 63 and are passed to phase discriminators 64, 65, 66 and 67 where the received signals are respectively compared in phase with signals of the same frequencies from oscillators 68, 69, 70 and 71 in the unit 33 (FIG. 3). The phase discriminators 64, 65, 66 and 67 are of the sampling type, the outputs of the oscillators 68, 69, 70 71 being fed to pulse producing circuits 72, 73, 74, 75 respectively to provide the short duration sampling pulses for applying to the phase discriminators. The phase discriminators are sine output discriminators, there being zero outputs when the oscillator outputs are in phase with the received signals; the discriminator outputs are thus D.C. voltages and they are applied to integrator/reactors 76, 77, 78 and 79 (FIG. 3) to control the oscillator frequencies. In two positions, "LOCK 1" and "LOCK 2" of the function switch 27 (FIG. 2), fast lock switching is applied via a lead 28 to the integrator/reactors 76, 77, 78 and 79. These integrator/reactors serve to control the frequencies of the respective oscillators so as to maintain a phase lock between each oscillator output and the respective input from the amplifiers 60, 61, 62 and 63. A further description of the oscillator control loop is given in the specification of U. S. Pat. No. 3,603,893 entitled "Phase Locked Oscillators."

The pulse outputs from the oscillators 68, 69 and 70 (at frequencies 5*F*, 8*F* and 9*F* respectively) are fed to frequency multipliers 80, 81 and 82 to give signals at frequencies 30*F*, 24*F* and 18*F* respectively. Considering the 30F signal from the multiplier 80, this signal is fed directly to a sine output phase discriminator 83 and is also fed via a quadrature phase shifter 84 to a cosine phase discriminator 85. These are sampling type phase discriminators, the sampling pulses being at 6F from the oscillator 71 via the pulse shaper 75 and an amplifier 87. The sine and cosine outputs from the phase discriminators 83, 85 are applied via DC amplifiers 88, 89 to the purple decometer 14. Similarly the red decometer 12 is driven by phase discriminators 90, 91 and DC amplifiers 92, 93 to indicate the phase relation between the 8F and 6F signals and the green decometer 13 is driven by phase discriminators 94, 95 and DC amplifiers 96, 97 to indicate the phase relation between the 9F and 6F signals. It will be noted that, by using locked oscillators to drive the decometers, the locked oscillators perform effectively as very narrow band filters, providing continuous nose-free drive to the decometers and bridging the interruptions in received signals during the short signalling breaks and during the multipulse transmissions.

Each of the decometers 12, 13 and 14 has a rotor carrying a pointer which traverses a circular scale. The angular position of the rotor is determined by the relative magnitudes and polarities of DC signals applied to orthogonal coils of the decometer. These DC signals are obtained from the DC amplifiers 88, 89 for the purple decometer and the corresponding amplifiers for the other decometers and hence correspond to the sine and cosine of the phase angle between the master and respective slave signals as received at the receiver. The angular position of the rotors thus correspond to the phase angle. The changes of phase angle are mechanically integrated and complete cycles of phase change are indicated by the associated lane indicator 15 which is driven through a reduction gear from the decometer rotor. The zone indicator 16 for each decometer is likewise driven through further reduction gearing form the lane indicator.

The decometers may be adjusted manually by means of manual control knobs 180. Operation of these controls enables the lane and zone indicators to be reset but the rotor of each phase angle indicator will take up a position corresponding to the measured phase angle. These knobs 180 therefore enable the lane and zone indicators 15, 16 to be reset without affecting the accuracy of the positional information from the phase angle measurement within a cycle.

The 6F pulse output from the pulse shaper 75 is used not only as the sampling pulse for the phase discriminators driving the three decometers 12, 13 and 14 and in the phase lock control loop for the 6F oscillator 71 but is fed also to a frequency divider 98 to give 1F pulses for purposes to be described later and is also fed via a quadrature phase shifter 99 to a cosine phase discriminator 100 (FIG. 2). In this discriminator 100, the 6F signals from amplifier 63 are sampled. This discriminator 100 thus gives its maximum output so long as the normal 6F signals from the master station are being received and the 6F oscillator 71 in the receiver is locked in phase to the 6F signals from amplifier 63.

The output from the discriminator 100 is fed via a lead 101 to an amplifier 110 in the heterodyne and reference oscillators 32 (FIG. 4). The output from the amplifier 110 is fed to the lock lamp 18 which will thus "blink" if the oscillator 71 is not properly phase locked. If the oscillator 71 is locked, the lamp 18 will remain continuously lit except during the multipulses and the breaks in the master transmissions immediately before the multipulses. The amplifier 110 also provides the input to a "break detector" 111 to detect the restoration of the 0.1 second after the break and so give an output signal which indicates the start of each multipulse.

The heterodyne and reference oscillator 32 contains a frequency synthesizer providing the heterodyne frequency $\Delta$ and also a reference oscillator for referencing the receiver.

The frequency synthesizer comprises a 436.907 kHz crystal oscillator 120 feeding a divider train 121 and a matrix 122 for combining the divider train outputs, the matrix 122 being controlled by the aforementioned chain selector switches 22, 23. The synthesized frequency output from the matrix is used to control the frequency of a heterodyne oscillator 123 having a phase lock control loop consisting of a sawtooth output discriminator 124 giving a DC output voltage applied to a reactor 125 controlling the oscillator frequency. The $\Delta$ frequency output from the oscillator 123 is used for frequency changing in the aforementioned mixers 47, 48, 49 and 50. The reference oscillator for referencing the receiver is an 8F oscillator 130. This oscillator is phase locked to the 1F pulses from the aforementioned divider 98 (FIG. 3), these pulses being applied via a lead 102 to a linear phase discriminator 131 (FIG. 4) having 1F sampling pulses from a divide-by-eight divider 132 fed from the output of oscillator 130 and the DC output voltage of discriminator 131 being applied to a reactor 133 to control the frequency of oscillator 130. The 1F output from the divider 132 is converted into 1F pulse signals by means of a mixer 134, receiving $\Delta$ frequency signals from oscillator 123, and a pulse shaper 135. The 1F pulses from the shaper 135 can be applied to the receiver input channels 43, 44, 45 and 46 (FIG. 2) via a gate 136. This gate 136 and the aforementioned gate 42 are controlled by the function switches 27; normally only the received signals are applied to the receiver input channels but, when the function switch 27 is in the "Reference" position, these signals are disconnected from the receiver channels by closing gate 42 and the 1F pulses are applied by opening gate 136. These pulses form a series of harmonics of the frequency 1f in a fixed multiple phase relation and the decometers 12, 13 and 14 are set to zero using the zero setting controls 24, 25 and 26. During referencing, the 6F oscillator 71 is not locked to received signals but the stability of this oscillator is such as to maintain the frequency of the reference oscillator 130 very closely during the referencing operation.

The lane identification is obtained by measuring the phase lag of an effective 1f signal from each slave station compared with a 1f signal from the master station. These 1f signals from the slaves are provided by the multipulse transmissions and are used after frequency changing to 1F. The master oscillator 71 provides the master 1F reference.

The multipulse signals for lane identification purposes are obtained in the receiver by combining the outputs at 5F, 8F, 9F and 6F from the amplifiers 60, 61, 62 and 63 in a multipulse circuit 140 (FIG. 5). The phase relationship of the radiated 5f, 8f, 9f and 6f signals in each multipulse transmission is such that they combine to give a peak pulse at a frequency 1f. Thus the 5F, 8F, 9F and 6F signals from the amplifiers 60, 61, 62 and 63 give a peak pulse at a frequency 1F and this is used to set a bistable 141 which is reset by the 1F output from the frequency divider 98 (FIG. 3) on lead 139. The bistable 141 (FIG. 5) controls a gate 142. The multipulse signal has a duration of a fraction of a second but contains many cycles at 1F. The gate 142 is cocked by a short duration lane identification read time pulse, referred to as the second L.T pulse obtained on a lead 151 from switching logic 147 to be described later. The gate 142 is cocked only for the duration of this second L.I pulse and serves only to pass pulses during one time period starting on a 1F multipulse signal and ended by the next 1F pulse from the divider 98. The gate 142 gates pulses from a 300F oscillator 143 into a store 144 via an OR gate 145. The multipulse circuit 140, from the received multipulse 1F signals, thus effectively provides one pulse synchronized with the effective 1F from the multipulse. This pulse opens the gate 142 and the next 1F signal from the divider 98 closes the gate. The multipulse signal will therefore produce a stored count in store 144 proportional to the multipulse-to-master delay, i.e., proportional to the complement of the Master:Multipulse zone pattern phase angle in 1/300th zone units. The total capacity of the store 144 corresponds to one complete cycle at 1F, i.e., a count of 300 at 300F. The required lane identification is obtained by determining the residual capacity in the store 144, this being done by filling the store until it overflows and determining the quantity required in 1/300th zone units for purple but in 1/240th zone units for red and 1/180th zone units for green. To do this, the store 144 is filled from the 300F oscillator 143 via a divider 146 which divides by a factor of 10 or 8 or 6 under the control of lane identification switching logic 147, to be described later, the division factor being 10 for purple, 8 for red and 6 for green. The divider output is fed to the store 144 via the OR gate 145. Simultaneously, the 300F signals from the oscillator 143 are fed via a 10 to 1 divider 148 and a gate 149 into a display register 150. The gate 149 is a two input AND gate having, as a second input a pulse signal derived from a pulse generator 152 which is started by a pulse, known as the fourth LI pulse, from the logic unit 147 on lead 153 and terminated by a stop pulse from the register 144 when the latter is full. The fourth LI pulse is a timing pulse slightly delayed after the second LI pulse. Thus, considering the red lane identification, the divider 146 is set to divide by eight and so the ratio of the number of pulses fed into the display register 150 to the number fed into the store 144 is 8 to 10. Similarly for the green lane identification, the ratio is 6 to 10. Thus, although the pulses fed into the store 144 are in units of 1/300th of a zone, those fed into the display register are in units of 1/240th of a zone for red, 1/180th of a zone for green and 1/300th of a zone for purple; in other words they now correspond to one tenth of a lane for each of the patterns.

The display register 150 has to be filled only during the time taken for the store register 144 to be filled after the initial count of the complement of the master to multipulse period. To do this the display register has to be reset for the start of the required period and the gate 149 closed when the store register 144 is completely full. This closing of the gate 149 is effected by an output signal from register 144 when this store register is full. The display register is reset for each multipulse by a first LI pulse from the switching logic 147. In the Decca (Registered Trade Mark) Navigator system, to avoid any possibility of confusion between readings on different patterns, the 24 lanes in a red zone are numbered from 0 to 23 and thus a red lane identification (to a tenth of a lane) is expressed as a number between 0 and 23.9. The 18 lanes in a green zone are numbered from 30 to 47 and so the green lane identification is expressed as a number between 30 and 47.9. The 30 lanes in a purple zone are numbered from 50 to 79 and so the purple lane identification is expressed as a number between 50 and 79.9. For these reasons, the display register 150 is set to zero at the beginning of the red lane identification count into that register, to 30 at the beginning of the green count into that register and to 50 at the beginning of the purple count into that register. The switching logic 147, in resetting the display register, therefore has appropriately to set the most significant decimal digit of the display register which is a binary coded decimal counter.

The lane identification switching logic 147 provides output gating signals referred to as the first LI pulse, on four leads 160, 161, 162 and 163 indicating the start of the master, red, green and purple multipulse transmissions respectively, these signals being used for setting the divider 146 to divide by the appropriate factor and to reset the display register 150 before the start of each count into that register. For this purpose, the switching logic 147 makes use of the "break" detector 111, and time division of 26.6 Hz and 13.3 Hz signals from the divider train 121 to provide a cycle of approximately 20 second period during which an output appears successively on the leads 160, 161, 162 and 163 at 2.5 second intervals. The master multipulse is the first of each sequence of four pulses and is identified thereby in the switching logic. The first LI pulse for each multipulse which is used for setting the store register 144 via lead 158 is timed to occur in the latter half of the multipulse period and is timed to occur about 0.3 to 0.4 of a second after the break in the master transmission. The second, third and fourth LI pulses follow the first LI pulse in each multipulse with small sequential delays appropriate for their respective logical operations.

The master multipulse LI signal on lead 160 is applied, by means of an OR gate 164, to the divider 146 and display register 150 in the same way as the red multipulse signal and is utilized for zeroing the lane identification outputs. In the receiver described, the frequency divider 98 dividing the 6F oscillator output down to 1F is not "notched," that is to say, the 1F output is not locked to any specific one of the six cycles of the 6F signal. There is therefore a sixfold possible ambiguity in the phase relation of the 1F output from divider 98 with respect to the 1F multipulse from the master station fed to the multipulse circuit 144. A correction is therefore put in the store register 144 to bring the lane identification reading on display register 150 to zero on the master multipulse transmission and this same correction is used for each of the other multipulse transmissions thereby correcting for the absence of notching on the divider 98 and also correcting for any other phase errors which might arise between the multipulse take-off and the master oscillator (6F oscillator 71) locking circuit. This correction is effected using a "phase" store 170 and a bistable 171. The bistable 171 can be set by depressing the lane identification zero push button 19 and it then provides a signal to a gate 172, which gate, when opened admits 30F pulses from divider 148 into the phase store 170. The bistable 171 is reset the next time the store register 144 is completely filled. The gate 172 is a four input AND gate and has an input on lead 156 from logic unit 147 so that the gate 172 is open only during master multipulse transmissions and not during slave multipulse transmissions. The fourth input to gate 172 is a third LI pulse on lead 157 from logic unit 147 so that the gate is only opened for the required appropriate time duration during the master multipulse transmission. The number of 30F pulses fed into the phase store 170 via the gate 172 is thus the same as the number fed into the display register 150. The reason for the four inputs to gate 172 is to ensure that the phase error reading is injected into store 170 at the third LI pulse only when the button 19 is pressed and only on a master multipulse transmission. The pulses from gate 172 are also fed via lead 173 into gate 145 and thus into the store register 144. When this register is full, it spills over and bistable 171 is reset. Thus the phase store 170 has the required correction and register 144 is in the zero state. Gate 181 ensures that the bistable 171 is reset only between the third and fourth LI pulses. This prevents bistable 171 being reset too early if the zero button 19 is pressed for example, immediately after the previous master lane identification.

The number thus put in the phase store 170 is then applied as an initial input to the store register 144 each time the latter is reset by the first LI pulse. Functionally, it is required that the phase store 170 should contain the phase reading on the master multipulse transmissions and thus the button 19 should be depressed before a master multipulse transmission. In practice however, the button can be depressed at any time and the next master multipulse reading on the display register 150 is 00.0 or 23.9. The required correction is thus set into the phase store 170. The count remains in the store 170 and is used for correction of each subsequent count in the store register 144.

The output on the display register 150 is visually indicated on the three tubes of the number tube display 17 (FIG. 1). In FIG. 5, these three tubes are shown at 174, 175 and 176, having associated binary-coded-decimal to decimal converters 177, 178 and 179 respectively. The master red, green and purple indications are displayed in sequence in that order, at 2.5 second intervals with a longer interval before the cycle repeats in its 20 second period. Because the numerical values of the green readings must be between 30 and 47.9 and the purple readings between 50 and 79.9, the various readings can readily be distinguished. However, to avoid any possible confusion between the master reading (which is 00.0 or 23.9 after the correction has been set in) and the red reading, the display is made to blink during the master indication, a suitable control signal being obtained from the switching logic 147. The displayed lane identification information is used to set in the lane readings on the indicators 15 of the decometers 12, 13, 14 using the manual control knob 180 on the respective decometers.

I claim:

1. In a receiver for a phase comparison radio navigation system of the kind in which signals of different multiples of a fundamental frequency $f$ are radiated in fixed phase relation from spaced transmitting stations, the transmitting stations normally radiating one signal at a time, but in which periodically the normal transmissions are interrupted and each station, one at a time in sequence, radiates all the frequencies to form a multipulse for lane identification, the multipulse being in a fixed cyclic time sequence from the various stations, and in which the receiver is of the heterodyne type for receiving signals from chains operating on different fundamental frequencies, the provision of a frequency synthesizer including a stable oscillator and divider chain for providing a plurality of selectable different frequencies for heterodyning the received signals whereby phase comparison means operating at fixed frequencies may be used irrespective of the actual radiated frequencies of the transmitting stations being used.

2. A receiver as claimed in claim 1 wherein there is provided a voltage controlled oscillator controllable over the range of required heterodyne frequencies and a phase comparator comparing the phase of the output of the voltage controlled oscillator with the selected output from the synthesizer to provide a control signal representative of the phase difference for application to said voltage controlled oscillator to phase lock the oscillator to the selected frequency.

3. A receiver as claimed in claim 1 wherein means are provided for deriving, from the frequency synthesizer, timing signals for providing outputs forming gating pulses during the successive received multipulse signals.

4. A receiver as claimed in claim 3 and for use with a navigation system in which the multipulse transmissions are signalled by an interruption in the normal transmission from one of the stations a short time before each multipulse transmission, wherein there are provided in the receiver means for detecting this interruption in the normal transmission and wherein timing means are provided using the divided down output from said divider chain to produce gating pulses at predetermined time intervals after the interruption is detected.

5. In a receiver for a phase comparison radio navigation system of the kind in which signals of different multiples of a fundamental frequency $f$ are radiated in fixed phase relation from spaced transmitting stations, the transmitting stations normally radiating one signal at a time, but in which periodically the normal transmissions are interrupted and each station, one at a time in sequence, radiates all the frequencies to form a multipulse for lane identification, the multipulse being in a fixed cyclic time sequence from the various stations, and in which the receiver is of the heterodyne type for receiving signals from chains operating on different fundamental frequencies, the combination of a stable oscillator and divider chain, a frequency synthesizer matrix coupled to said divider chain for providing a plurality of selectable different frequencies, selector means for selecting one of said different frequencies from the matrix, frequency multiplier means for separately multiplying the selected frequency by multiplication factors corresponding to harmonic numbers of the radiated frequencies, a separate mixer for each received signal mixing the received signal with the corresponding multiplied selected frequency to heterodyne the received signals, means for selecting the lower side bands from the mixers and phase comparison means determining the phase relationships between the selected lower side bands.

6. A receiver as claimed in claim 5 wherein there is provided a voltage controlled oscillator controllable over the range of required output frequencies from the matrix and a phase comparator comparing the phase of the output of the voltage controlled oscillator with the selected output from the synthesizer matrix to provide a control signal representative of the phase difference and means for applying the control signal to said voltage controlled oscillator to phase lock the oscillator to the selected frequency.

7. A receiver as claimed in claim 6 and for use with a navigation system in which the multipulse transmissions are signalled by an interruption in the normal transmission from one of the stations a short time before each multipulse transmission, wherein there are provided in the receiver break detection means for detecting the interruption in the normal transmission and wherein timing means are provided with timing control from the divided down output from said divider chain, said timing means being coupled to the break detection means to be responsive to the detected break to produce gating pulses at predetermined time intervals after the interruption is detected but during the multipulse transmissions and wherein digital phase comparison means are provided operating during periods controlled by said gating pulses to determine the phase relationships between signals derived from the received multipulse transmissions.

* * * * *